United States Patent [19]
Beauchet

[11] 3,929,044
[45] Dec. 30, 1975

[54] CUTTING WHEELS FOR THE ISOSTATIC CUTTING OF PIECES, NOTABLY FROM TUBES

[75] Inventor: Jean Beauchet, Annecy, France

[73] Assignee: Societe Nouvelle de Roulements, Annecy, France

[22] Filed: Oct. 5, 1973

[21] Appl. No.: 403,957

[30] Foreign Application Priority Data
Oct. 16, 1972  France .............................. 72.36542

[52] U.S. Cl. .................... 82/46 A; 29/95; 29/567; 29/103; 82/92; 30/102; 30/347; 30/357
[51] Int. Cl.² .. B23B 5/14; B26D 1/00; B23D 21/06
[58] Field of Search ............ 30/101, 102, 347, 357, 30/92, 94, 100; 82/70.1, 46 A, 92, 93, 94, 95, 96, 97, 98, 46; 29/95, 103, 567

[56] References Cited
UNITED STATES PATENTS

| | | | |
|---|---|---|---|
| 1,435,467 | 11/1922 | Harman | 30/102 |
| 1,681,807 | 8/1928 | Kenerson | 30/102 |
| 1,833,980 | 12/1931 | Thewes | 30/347 X |
| 2,350,667 | 6/1944 | Bates | 30/102 X |
| 2,361,288 | 10/1944 | Hardy, Jr. | 29/95 |
| 3,013,335 | 12/1961 | Kowal | 30/102 X |
| 3,078,546 | 2/1963 | Kiernan | 29/95 |
| 3,152,385 | 10/1964 | Wheildon, Jr. et al. | 29/95 |
| 3,292,478 | 12/1966 | Falk et al. | 30/357 X |
| 3,335,492 | 8/1967 | Spiro | 30/101 |

Primary Examiner—Harrison L. Hinson
Attorney, Agent, or Firm—Stevens, Davis, Miller & Mosher

[57] ABSTRACT

This cutting wheel for isostatic cutting device comprises a cutting edge having a rounded tip, followed by a first frustoconical portion having a greater vertex angle than the second frustoconical portion following said first portion, said frustoconical portions being interconnected by a fillet.

4 Claims, 3 Drawing Figures

CUTTING WHEELS FOR THE ISOSTATIC CUTTING OF PIECES, NOTABLY FROM TUBES

U.S. Pat. appln. No. 147841 of May 28, 1971 relates in particular to an isostatic cutting device operating without removing chips and adaptable to single-spindle or multi-spindle automatic lathes, and comprising tools adapted to cut pieces or blanks of which the shapes are better adapted for the subsequent machining or other operations contemplated.

The present invention is concerned with specific and typical embodiments of cutting tools capable of imparting to these tools an improved strain and wear resistance.

Figure 1:
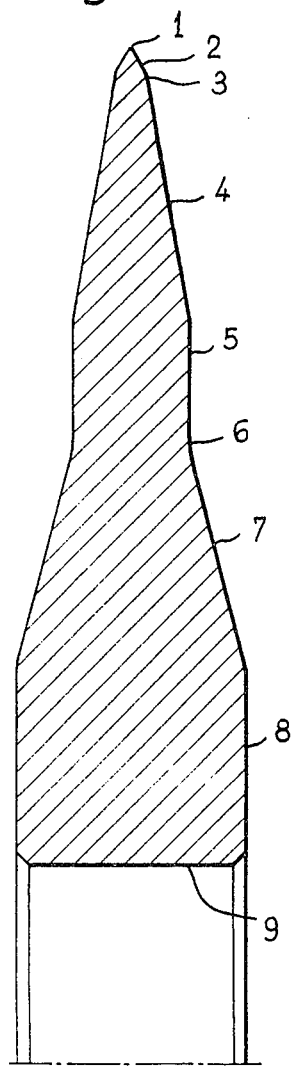
FIG. 1 illustrates in radial section a solid cutting wheel.

Referring first to FIG. 1, the solid cutting wheel illustrated therein provides the best possible compromise between the cutting stress and the mechanical strength against strain and wear.

This cutting wheel comprises at its cutting edge a rounded portion 1 having a radius of only a few tenths of millimeter to prevent the rapid disintegration thereof. Following this rounded edge is a tapered portion 2 of which the half angle A to the vertex may be of about 30° with a maximum width advantageously of about one millimeter. This relatively wide angle enables the wheel to withstand flexure efforts due to the resistance to the penetration of the wheel into the piece or blank to be cut. The tapered peripheral portion 2 is followed by another tapered portion 4 having a vertex half-angle B advantageously of 10° with a maximum width or thickness of about 2 mm. This rake angle permits of limiting the frictional contacts between the wheel and the stock to be cut and therefore the efforts implemented. A fillet 3 having advantageously a radius of a few tenths of mm connects the above-described portions 2 and 4. At the same time, it ensures a better flow of the cut material, thus limiting the efforts.

The assembly of elements 1, 2, 3 and 4 constitute the cutting edge proper. This assembly is followed towards the centre by a constant-section portion 5 permitting the re-grinding of the tool, and then by another, thicker tapered portion 7 of which the half-angle to the vertex may be of about 30°. This last portion permits of connecting the cutting edge to a thicker or body portion for fixing the tool. A fillet 6 having a radius of a few millimeters interconnects the aforesaid portions 5 and 7. It improves the flexion strength of the operative portion of the tool. Finally, a constant-thickness portion 8 constitutes the actual body of the wheel and permits a proper positioning by clamping same between suitable flanges.

A bore 9 is provided for supporting centering and driving the tool on a shaft. This cutting wheel is made from materials having preferably a minimum hardness of 62 HRc (Rockwell with diamond taper). By way of example, this material may consist of high speed steel or 12% chrome steel.

Figure 2:
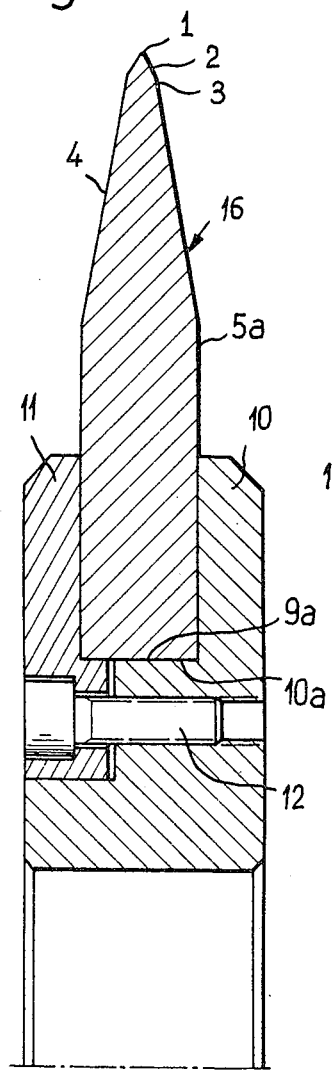
FIG. 2 illustrates also in radial section a disc-type wheel clamped between a pair of supporting flanges.

A modified embodiment illustrated in FIG. 2 corresponds to a disc-wheel 16 clamped between two flanges. With this version an appreciable saving of noble material is made. This disc is sandwiched between a pair of flanges 10 and 11 of more common and therefore economical material.

The portions 1, 2, 3 and 4 of wheel 16 have the same functions as those described hereinabove. However, portion 5a, of constant thickness, while permitting likewise re-grinding operations, constitutes the wheel body and ensures an accurate positioning of the wheel when this portion is clamped. The bore 9a permits of properly supporting and centering the wheel on a core 10a of the supporting flange 10. The other flange 11 is adapted to clamp the wheel by means of its faces 5 between the registering pressure surfaces of said flanges 10 and 11. Screw means 12 are provided for rigidly assembling the wheel and flanges and fitting this assembly on the same device as that contemplated for receiving the wheel of FIG. 1. This disc-wheel is made from the same material as set forth in the foregoing.

Figure 3:
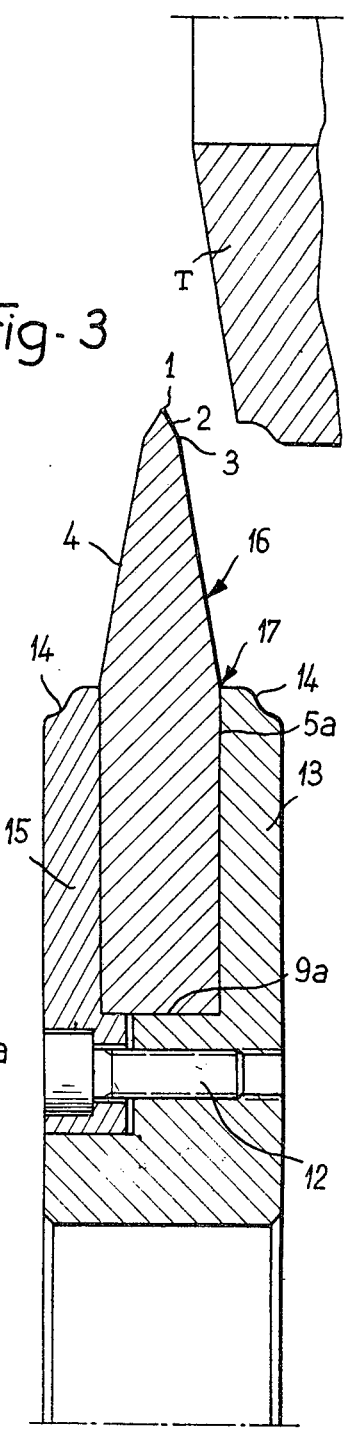
FIG. 3 illustrates in radial section the same disc wheel as that shown in FIG. 2 but clamped between two flanges also acting as tool means.

In the modified embodiment of FIG. 3 the same disc-wheel 16 as that illustrated in FIG. 2 is used, but in this case the disc-wheel 16 is disposed between a pair of flanges also acting as tool means. With this embodiment it is possible to form on the outer peripheral edges of each cut piece of blank an outer contour such as shown for one of the cut pieces T which in this case comprises a shoulder shaped by the relevant flange.

The portions 1, 2, 3 and 4 of this wheel have the same functions as those set forth in connection with FIG. 1. However, said portions 5a and 9a have the same functions as those set forth in connection with the corresponding elements of FIG. 2. A supporting flange 13 permits of supporting and driving the disc-wheel through its bore 9a. The outer portion 14 of this flange, machines according to a predetermined contour, permits of reproducing the same contour on the blank to be cut, by upsetting the metal, as clearly shown in the cut piece portion T illustrated.

A clamping flange 15 permits of pressing and holding the wheel faces 5 by means of the registering bearing surfaces of flanges 13 and 15. The outer portion 14 of the flange, which is machined with the same contour as flange 15, also permits of reproducing this contour on the piece or blank to be cut. Screw means 12 are provided for fastening the assembly.

The flanges 13 and 15 are also made from a noble material having preferably a Rockwell hardness 62 HRc.

With this arrangement a simpler grinding of the cutting edge and a higher strength than that obtainable in the case of a one-piece wheel can be achieved considering the sharp edges and angles existing at 17.

Although the present invention has been described with specific reference to preferred forms of embodiment, it will readily occur to those skilled in the art that various modifications may be brought thereto without departing from the spirit and scope of the invention as set forth in the appended claims.

I claim:

1. A cutting wheel for an isostatic cutting device comprising:
   a disc-wheel comprising:
      a cutting edge having a rounded tip,
      a first frustoconical portion extending inwardly from the tip, a second frustoconical portion extending inwardly from said first frustoconical portion, said second frustoconical portion having a vertex angle less than that of said first frusto-conical portion, a fillet interconnecting said first and second frustoconical portions, and a portion having parallel side surfaces extending inwardly from said second frustoconical portion, and two supporting flanges, said parallel-sided portion being clamped between said two supporting flanges, one of said two flanges abuts the entire surface of one of the side surfaces of the parallel sided portion and the other one of said two flanges abuts the entire surface of the other side surface of the parallel-sided portion said supporting flanges form an operative portion of a tool operating by upsetting the metal around the cut formed by the cutting edge.

2. A cutting wheel as set forth in claim 1, wherein: the flanges are made of a material having substantially the same hardness as that of the disc-wheel.

3. A cutting wheel as set forth in claim 1, wherein the first frustoconical portion has a vertex half angle of about 30° and the second frustoconical portion has a vertex half angle of about 10°.

4. A cutting wheel as set forth in claim 1, wherein the maximum width of said first frustoconical portion is about 1 mm and that the maximum width of said second frustoconical portion is about 2 mm.

* * * * *